(12) United States Patent
Duesterberg et al.

(10) Patent No.: US 7,512,306 B2
(45) Date of Patent: Mar. 31, 2009

(54) POLARIZATION MAINTAINING FIBER PIGTAIL ASSEMBLY

(75) Inventors: Richard L. Duesterberg, Mountain View, CA (US); Jay A. Skidmore, San Jose, CA (US); Marc K. Von Gunten, Los Altos, CA (US); Nicolas Guerin, San Francisco, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 11/964,530

(22) Filed: Dec. 26, 2007

(65) Prior Publication Data

US 2008/0212916 A1  Sep. 4, 2008

Related U.S. Application Data

(60) Provisional application No. 60/883,221, filed on Jan. 3, 2007.

(51) Int. Cl.
*G02B 6/36* (2006.01)

(52) U.S. Cl. .......................................... 385/137; 385/11
(58) Field of Classification Search ........................ None
See application file for complete search history.

(56) References Cited

U.S. PATENT DOCUMENTS

| | | | | |
|---|---|---|---|---|
| 4,753,497 A * | 6/1988 | Fujii et al. | ..................... | 385/42 |
| 5,015,055 A * | 5/1991 | Takamatsu et al. | ............ | 385/31 |
| 5,071,215 A * | 12/1991 | Hockaday | ..................... | 385/49 |
| 5,259,059 A * | 11/1993 | Abramov | ..................... | 385/123 |
| 5,293,440 A * | 3/1994 | Miles et al. | ..................... | 385/51 |
| 5,323,225 A * | 6/1994 | Dyott | ......................... | 356/73.1 |
| 5,340,371 A * | 8/1994 | Dyott | ......................... | 65/501 |
| 5,389,193 A * | 2/1995 | Coucoulas et al. | ............ | 216/24 |
| 5,926,594 A * | 7/1999 | Song et al. | ..................... | 385/49 |
| 5,940,557 A * | 8/1999 | Harker | ......................... | 385/33 |
| 6,146,025 A | 11/2000 | Abbink et al. | ................ | 385/88 |
| 6,332,721 B1 | 12/2001 | Inokuchi | ..................... | 385/93 |
| 6,337,874 B1 | 1/2002 | Yang | ........................... | 372/102 |
| 6,400,746 B1 | 6/2002 | Yang | ........................... | 372/102 |
| 6,480,657 B1 | 11/2002 | Dai | ............................. | 385/123 |
| 6,748,137 B2 | 6/2004 | Wolak et al. | ................... | 385/33 |
| 6,758,610 B2 | 7/2004 | Ziari et al. | ..................... | 385/92 |
| 6,782,011 B2 | 8/2004 | Kusano et al. | ................. | 372/6 |
| 6,969,205 B2 | 11/2005 | Duesterberg et al. | .......... | 385/94 |
| 7,249,894 B1 * | 7/2007 | Korn et al. | ..................... | 385/92 |
| 2002/0191915 A1 * | 12/2002 | Anjan | ......................... | 385/43 |
| 2003/0053758 A1 * | 3/2003 | Monte | ......................... | 385/52 |

* cited by examiner

*Primary Examiner*—Sung H Pak
*Assistant Examiner*—Mike Stahl
(74) *Attorney, Agent, or Firm*—Allen, Dyer, Doppelt, Milbrath & Gilchrist, P.A.

(57) ABSTRACT

The invention provides a fiber pigtail assembly wherein a polarization maintaining fiber is soldered directly to a mounting pad without a sleeve or a ferrule therebetween. A portion of the polarization maintaining fiber near a fiber end is embedded in a vertical slow axis orientation within an asymmetrical solder ball having a flat portion for adhering to the mounting pad. The vertical slow axis orientation of the polarization maintaining fiber within the solder ball enhances power stability and polarization extinction ratio properties of optical modules utilizing the invention.

18 Claims, 8 Drawing Sheets

POLARIZATION MAINTAINING FIBER PIGTAIL ASSEMBLY

CROSS-REFERENCE TO RELATED APPLICATIONS

The present invention claims priority from U.S. Provisional Patent Application No. 60/883,221 filed Jan. 3, 2007, entitled "Optimization Of PM-Fiber Alignment Orientation To Improve Power Stability And Extinction Ratio For Optical Pump Modules", which is incorporated herein by reference for all purposes.

TECHNICAL FIELD

The present invention generally relates to polarization maintaining optical fibers, and more particularly relates to mounting polarization maintaining optical fibers in optical modules.

BACKGROUND OF THE INVENTION

Optical and optoelectronic modules of various types used in telecommunications and sensor industries typically utilize optical fibers to input or output light, or to transmit light between their internal optical components. Accordingly, providing a low-cost and efficient optical connection between an optical component and optical fiber is one of the most important requirements in designing fiber-coupled optical modules.

One type of such optical connection that is presently utilized to connect an optical component to an optical fiber is commonly referred to as an optical fiber "pigtail" connection. A fiber pigtail is a length of optical fiber, generally having a portion of its buffer coating removed and often coated with a metallized coating. Such pigtail connectors or couplings can optically couple an optical fiber or lensed optical fiber with light-producing or light-detecting elements coupled to leads of an integrated circuit. The light-producing element, for example, can be a semiconductor or diode laser, a frequency doubling crystal or a waveguide; a light-detecting element could be a photodiode. These elements are typically coupled with and fixedly disposed and oriented to an end of the lensed optical fiber, which is located in such a manner as to reside within the housing often forming a hermetic seal therewith. The lensed or collimating fiber extends beyond the edge of the housing and into it carrying signals to and/or from the integrated circuit. Mounting the fiber pigtail within the housing is not a trivial procedure. For example, alignment of a laser diode mounted within the housing with an end of the fiber pigtail must be usually such that maximum coupling of light exists from a laser to the fiber. Furthermore, the coupling must be robust, maintaining optimum alignment and coupling over time and often through changes in temperature and humidity. This coupling should preferably be tolerant of being handled or even dropped. Optical-coupling schemes that require high efficiency may utilize a lensed fiber that is attached to a substrate in close proximity to the light source, or discrete bulk lenses between the laser and the fiber. In both instances, the optical fiber is attached some minimum distance ~0.5 mm away from the optical fiber termination.

One low-cost method of forming a relatively secure fixed connection between an optoelectronic component such as a laser diode and a photodiode and an optical fiber within a same package, is to coat a length near an end of an optical fiber pigtail with metal, and then solder it into position to a metal pad within a housing. For example, U.S. Pat. No. 6,146,025 discloses a package wherein an end of an optical fiber is stripped down to the cladding having a portion of the outer jacket removed and wherein the stripped clad portion is metallized and then attached to a metal pad in front of a laser with a solder ball.

This fiber mounting method has been used to mount conventional single-mode optical fibers in optical modules wherein the polarization state of the coupled light does not have to be preserved. In applications where polarization control between the optical component and a distal end of a fiber pigtail is required, the fiber pigtail is conventionally formed using a polarization-maintaining (PM) optical fiber. Applications of PM fibers include fiber Bragg grating (FBG) coupled pump lasers for erbium-doped, semiconductor and Raman optical amplifiers, and fiber-coupled frequency doubled lasers, wherein a pump laser can be coupled to a frequency doubling element such as a LiNbO3 waveguide with a PM fiber.

Figure 1:
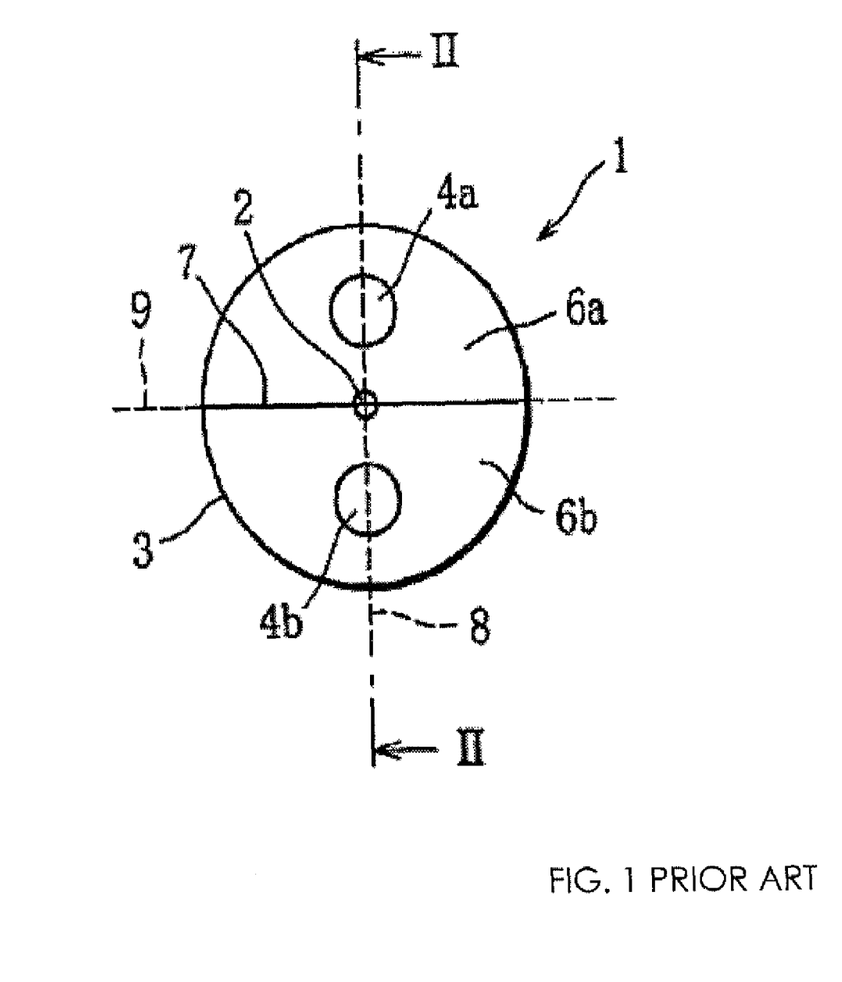
FIG. 1 is a diagram illustrating a prior art polarization maintaining optical fiber.

PM optical fibers differ from conventional optical fibers in that they transmit light while maintaining the polarization of light launched therein as the light propagates within the optical fiber, provided that the light is coupled into the PM fiber with it polarization aligned to one of two principal polarization axes of the PM fiber. These two principal axes are conventionally referred to as slow and fast axes, and typically result from a stress-induced birefringence in the PM fiber core. Due to this birefringence, optical signals polarized along these two axes will propagate with different speed with little coupling therebetween, so that the polarization of light is preserved when light propagates in the fiber. One common way to induce a permanent intrinsic stress so as to form a PM fiber is to provide two stress-inducing regions such as stress rods extending longitudinally within the optical fiber on opposite sides of the optical fiber core, as illustrated in FIG. P1 showing a cross-section of a PM fiber, which is commonly referred to as a Panda fiber, having a core 2 and two stress-inducing regions 4a and 4b. The slow axis 8 is oriented so as to connect centers of the stress rods 4a,b, while the fast axis 9 of the PM fiber is orthogonal to the slow axis 8. The stress-inducing regions 4a, 4b may be made of a material, for example boron-doped silicon oxide, which has a different coefficient of thermal expansion than those of the core 2 and clad 3 which are made of glass, so that a uniaxial tensile stress is applied to the core 2 in a plane of the stress rods 4a,b in a direction perpendicular to the longitudinal direction of the PM fiber, thereby defining the orientation of the slow axis 8.

The quality of a PM fiber in maintaining the polarization of light is conventionally characterized by the polarization extinction ratio (PER), which is the ratio of optical power of the light component in a dominant polarization state, typically corresponding to a linear polarization, to the optical power of the light component in the polarization state orthogonal thereto. The PER is conventionally measured in dB. It is typically desirable that the PER of light does not considerably degrade, i.e. is reduced as little as possible, between the input and output of a PM fiber. In other words, it is typically desirable that the PER of light at the output of a PM fiber is as high as possible.

Since the polarization maintaining quality of PM fibers relies on stresses within the optical fiber core, the polarization maintaining quality can be degraded by externally induced stresses associated with fiber bonding and soldering. Therefore, to make the external stresses associated with fiber bonding and mounting easier to control, such fibers have been traditionally mounted by soldering the PM fiber first inside a metal sleeve, and then bonding, for example soldering this sleeve with the PM fiber inside to a housing, since the external stresses associated with fiber soldering can be more symmetrical within a symmetrical sleeve, and therefore they are less likely to affect the built-in birefringence of the PM fiber, and therefore less likely to degrade the PER. Such PM fiber pigtail assemblies are disclosed in numerous publications including many US patents, for example, in U.S. Pat. Nos. 6,332,721 and 6,337,874 issued to Inokuchi and U.S. Pat. No. 6,400,746 issued to Yang, all of which disclose laser diodes utilizing PM fiber pigtail assemblies wherein the PM fibers are mounted within a cylindrical sleeve, which is then affixed to the laser housings.

In a typical prior art packaging procedure of a PM fiber pigtail, a portion of the PM fiber is surrounded with a solder preform and the solder preform is surrounded with a sleeve. The solder is then melted and allowed to solidify to secure the optical fiber within the sleeve. Historically, it has been often considered preferable to position a polarization maintaining fiber at the center of the packaging wherein the stresses on the cladding from the packaging are equalized, so to have the least effect on the optical fiber's PER from the packaging induced stresses as compared to other packaging configurations. However, one drawback of this procedure is that a PER degradation may occur because it is difficult to precisely position a PM fiber at the center of the sleeve. With the sign and the degree of the eccentricity of the fiber positioning within the sleeve being difficult to control and predict, the fiber PER can be degraded by the solder-induced stresses within the sleeve.

Figure 2:
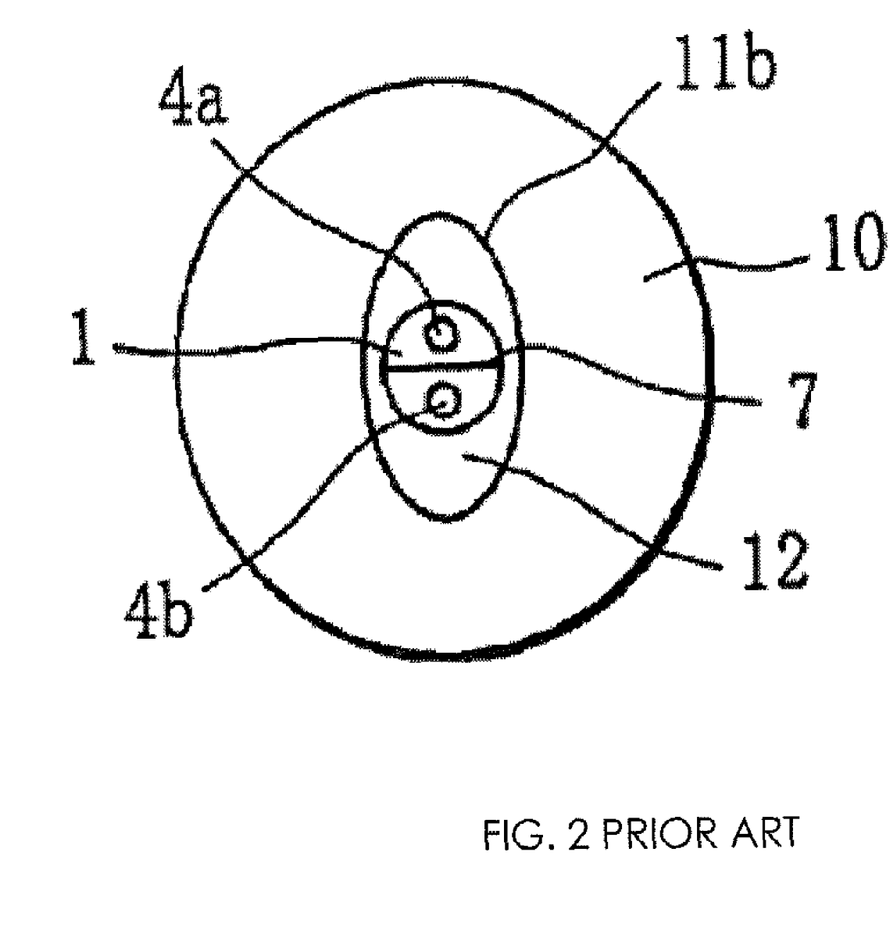
FIG. 2 is diagram illustrating a prior art polarization maintaining optical fiber pigtail soldered within an elliptical sleeve for mounting with an optical component.

U.S. Pat. No. 6,480,675 issued to Dai and U.S. Pat. No. 6,782,011 issued to Kusano teach that this difficulty can be overcome by utilizing PM fiber mounting assemblies wherein a PM fiber is soldered within and elliptical or oval inner cavity of a sleeve or a ferrule, which holds a laser-coupled end of a PM fiber pigtail fixedly attached in a laser housing. By aligning the fast and slow axes of a PM fiber within the sleeve with one of the short and long axes of the elliptical cavity, so that the sleeve is symmetrical with respect to both the slow and fast axes of the PM fiber, the externally induced stress is made to be aligned with the internal PM fiber stress, e.g. the tensile stress induced in the fiber core 2 by the PM fiber stress rods 4a,b, as illustrated in FIG. P2 reproducing FIG. 9 of the '011 patent. In this figure, the PM fiber 1 is soldered within an oval solder reservoir 11b of a sleeve 10, which is referred to in the '011 patent as a ferrule.

To facilitate efficient coupling of the laser light into the PM fiber, a spherical or a chisel lens is often formed at the PM fiber end facing the laser, with a chisel having two inclined faces forming a ridgeline across the laser-facing end of the PM fiber. The chisel lens is typically formed by grinding the fiber end at an angle against a running grinder tape. After the formation of one inclined face, the fiber end is turned 180 degrees around its longitudinal direction, and the fiber end is again pressed against the running grinder tape to form the second inclined face. The '011 patent teaches to form the inclined faces so that the grinding removes cracks or flaws at the end of the PM fiber that may occur near the stress rods 4a,b during cleaving of the PM fiber. More particularly, the '011 patent teaches to grind the PM fiber end so that the stress-applied regions 4a, 4b are at the inclined faces of the chisel lens and are not exposed across the ridgeline 7. By selecting this orientation of the ridgeline 7 of the chisel lens at the end of the PM fiber relative to the stress rods 4a,b, a better quality of the chisel lens at the fiber end can be attained.

Accordingly, the prior art solutions to attaching a PM fiber pigtail within a housing of an optical module involve utilizing sleeves of ferrules, preferably with elliptical inner cavities as solder reservoirs, to hold the PM therein, and then affixing the sleeve with the PM fiber in it by bonding or soldering to the housing with the fiber proximate to an optical component to couple thereto, e.g. a laser. These types of pigtail assemblies, although appearing to perform their intended function, are however significantly more complex in fabrication than the direct soldering of fiber to a mounting pad, require non-standard components such as elliptical ferrules and sleeves to ensure that the PER is not degraded, and significantly add to the manufacturing costs of the final optical module.

An object of the present invention is therefore to overcome the shortcomings of the prior art by providing a low cost PM fiber pigtail assembly that preserves a high polarization extinction ratio of coupled light while utilizing a sleeve-less fiber mount.

SUMMARY OF THE INVENTION

In accordance with the invention, an optical fiber pigtail assembly is provided, which comprises a mounting pad, a polarisation maintaining (PM) optical fiber having a fast polarisation axis and a slow polarisation axis orthogonal to the fast polarization axis, and an end for optically coupling the PM optical fiber to an optical component; the PM optical fiber is soldered directly to the mounting pad near the end of the PM optical fiber without a sleeve therebetween in a vertical slow axis orientation, so that the fast polarization axis is generally parallel to the mounting pad and wherein the slow polarization axis is generally orthogonal to the mounting pad.

In accordance with one aspect of this invention, a portion of the PM optical fiber near the end is embedded in a solder ball comprising solder material fixedly attaching the PM fiber to the mounting pad, wherein the solder ball is asymmetrical with respect to the fast axis of the PM fiber.

In accordance with another aspect of this invention, an optical module is provided comprising the fiber pigtail assembly utilizing a polarization maintaining fiber that is soldered directly to a mounting pad in the slow vertical axis orientation, and further comprising the optical component disposed to receive polarized light from or couple polarized light into the end of the PM fiber, wherein the end of the PM fiber comprises a lens for coupling to the optical component.

Another aspect of the present invention provides a method of mounting a PM fiber in a fiber pigtail assembly, the fiber having an end for coupling polarized light into or out of the PM fiber, the method comprising: a) providing a mounting pad, b) determining the direction of a slow polarization axis at the end of the PM fiber, and c) securing the PM fiber near the end directly to the mounting pad with solder so that the slow polarization axis is generally perpendicular to the mounting pad.

BRIEF DESCRIPTION OF THE DRAWINGS

The invention will be described in greater detail with reference to the accompanying drawings which represent preferred embodiments thereof and in which like reference labels are used to indicate like elements, wherein.

DETAILED DESCRIPTION

Figure 3:
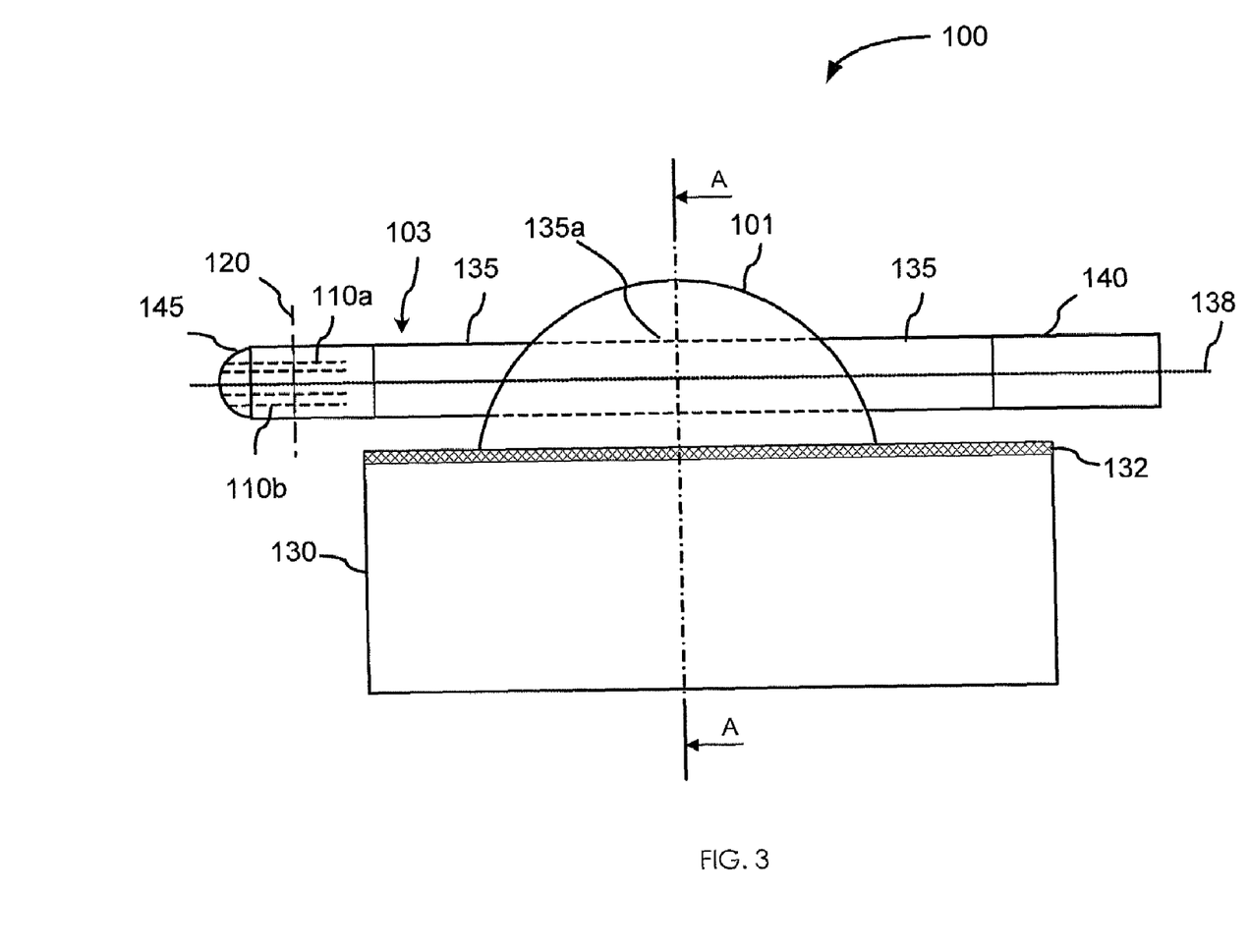
FIG. 3 is a side view of a PM optical fiber pigtail assembly according to the present invention.
Figure 4:
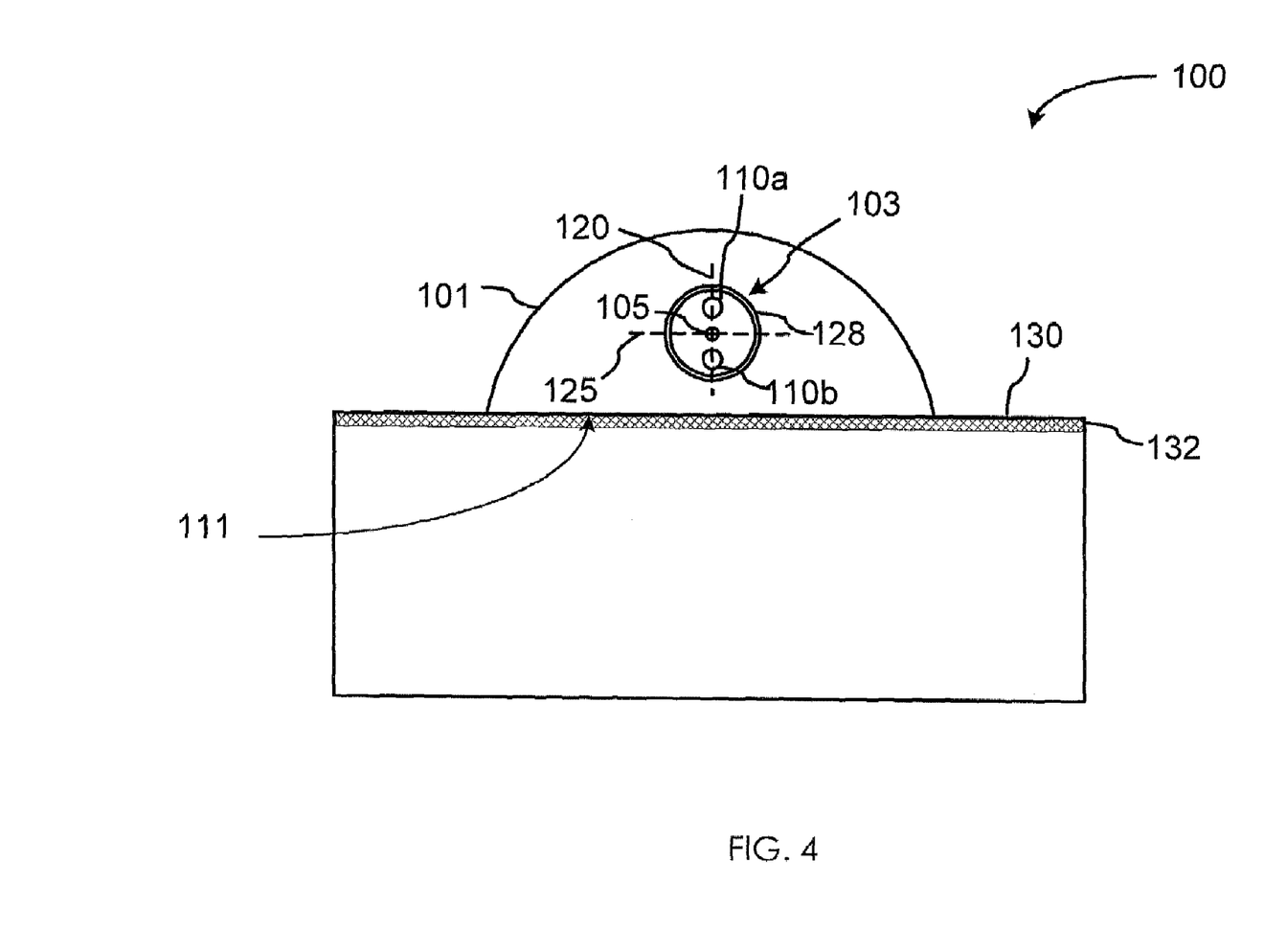
FIG. 4 is a cross-sectional view of the PM optical fiber pigtail assembly of FIG. 3 as taken along line A-A.

An exemplary embodiment of the PM optical fiber pigtail assembly of the present invention is illustrated in FIGS. 3 and 4 and will now be described.

Referring first to FIG. 3, the PM optical fiber pigtail assembly (PMFA) 100 includes a PM optical fiber (PMF) 103, which is soldered directly to a mounting pad 130 without a sleeve or a ferrule around the PMF 103 separating it from the mounting pad 130. The PMF 103 has an end 145 for coupling to an optical component (not shown), the end 145 of the PMF 103 being also referred to hereinafter as the proximate fiber end 145 or simply as the proximate end 145. A portion 135a of the PMF 103 near the proximate fiber end 145 is embedded in a solder ball 130, which adheres to both the PMF 103 and the mounting pad 130 and fixedly attaches the PMF 103 to the mounting pad 130. The end 145 of the PMF 103 may have a microlens formed therein for enhancing coupling efficiency to the optical component. A distance between the attached portion 135a of the PMF 103 and the proximate fiber end 145 is preferably between 0.2 millimeters (mm) and 2 mm, and more preferably between 0.25 mm and 0.5 mm. The soldered portion 135a of the PMF may have a length in the range of about 0.2 mm to about 1 mm, and preferably between 0.3 mm and 0.6 mm.

Turning now to FIG. 4 showing a cross-section of the PMFA 100 along the line (A-A), the PMF 103 has two stress inducing regions 110a, 110b in the form of stress rods that are incorporated within the PMF 103 on opposite sides of its core 105, extending along a longitudinal axis 138 (FIG. 3) of the PMF 103. The stress rods 110a,b induce tensile stress along an axis 120 connecting their centers and orthogonal to the longitudinal PMF axis 138, causing birefringence in the PMF 103 for light propagating therein, with the axis 120 being the slow polarization axis of the PMF 103, and an axis 125 that is orthogonal to both the slow axis 120 and the longitudinal axis 138 of the PMF 103 being the fast polarization axis of the PMF 103. The illustrated embodiment of the PM fiber, which incorporates two stress members or stress rods 110a,b, is often referred to as a Panda-type PM fiber. Other types of PM fibers are also known in the art, such as an elliptical stress bar fiber and a bow tie fiber, which utilize uniaxial intrinsic stress within the fiber to induce birefringence in the fiber core. According to the present invention, these fibers can also be used in other embodiments of the PMFA 100 as the PMF 103, with the slow polarization of the utilized PM fiber oriented normally to the mounting pad 130.

According to the invention, the PMF 103 within the solder ball 101 is oriented so that the fast polarization axis 125 is generally parallel to the mounting pad 130 and wherein the slow polarization axis 120 is generally orthogonal to the mounting pad 130. Further according to the invention and contrary to the prior art PMF mounting assemblies, the solder ball 101, which attaches the PMF 103 directly to the mounting pad 130 without a sleeve therebetween, is asymmetrical relative to the fast polarization axis 125 of the PMF 103, and has a generally flat lower portion 111 for adhering to the mounting pad 130 and a generally rounded top portion above the PMF 103. Unexpectedly, we found that this orientation of the PMF fiber 103 within the asymmetrical solder ball 101 provides for enhanced PER and creep stability properties in optical modules, as described hereinbelow.

The solder ball 101 may be formed by melting and re-flowing at elevated temperatures a solder material such as glass frit or metal solder. Turning back to FIG. 3, in a preferred embodiment a portion 135 of the PMF 103 near its end 145 is stripped from its buffer and coated with an outer metal layer 128 (FIG. 4), which may have a gold (Au) outer surface. The mounting pad 130 may be formed from a ceramic material such as micor, zirconia, or alumina and has a top metal layer or layers 132 preferably with a gold containing surface for soldering the PMF 103 thereto. The solder ball 101 may be formed by re-flowing a eutectic solder alloy AuSn to encompass the metallized portion 135 of the PMD 103, adhering to it and to the top metal layer 132 of the mounting pad 130. The solder material of the solder ball 101 may have a melting temperature of about 250 degree C. or higher. Composition percentages such as 80%-Au and 20%-Sn or other compositions may be contemplated for the solder material of the solder ball 101. Other suitable solder materials include BiSn, SnAu, SnAgCu and AuGe. After cooling, a portion 135a of the metallized portion 130 of the PMF 103 remains embedded within the solder ball 101, which adheres to the mounting pad 130.

The mounting pad 130, the solder ball 101, and the PMF 103 have differing coefficients of thermal expansion (CTE). Typically, the CTE of the solder material exceeds the CTE of both the PMF 103 and the mounting pad 130. By way of example, the AuSn solder material of the solder ball 101 has a CTE of approximately 17 ppm/° C., and the ceramic material of the mounting pad 130 has a lower CTE of approximately 10.2 ppm/° C., which is closer to the CTE of the PMF 103 as compared to the solder. Due to these differences in the CTE, and due to the asymmetrical configuration of the joint PMF-solder-mounting pad of the PMFA 100, the soldered portion 135a of the PMF 103 experiences asymmetrical stresses within the solder ball 101 as it solidifies and cools down to a room temperature, changing the stress pattern within the soldered portion 135a of the PMF 103.

We discovered that the effect of these asymmetrical stresses differs depending on the orientation of the slow and fast axes of the PMF 103 within the solder ball 101, and is comparatively more beneficial for the polarization axes orientation shown in FIGS. 3 and 4, which is hereinafter also referred to as the vertical slow axis orientation. Note that in the context of this specification the terms "slow axis" and "fast axis", when used in relation to the PMF 103 and/or its soldered portion 135a, refer to the slow and fast polarization axes of the PMF 103 in the absence of external stresses such as those induced by the solder ball 101. In particular, we discovered that when the PMFA 100 is used for coupling to an optical component, the vertical slow axis orientation of the PMF 103 in the solder ball provides significant PER and power stability advantages compared to a horizontal slow axis orientation, i.e. when the PMF 103 is oriented within the solder ball 101 in such a way that the fast axis 125 is orthogonal, and the slow axis 120 is parallel to the mounting pad 130.

Figure 5:
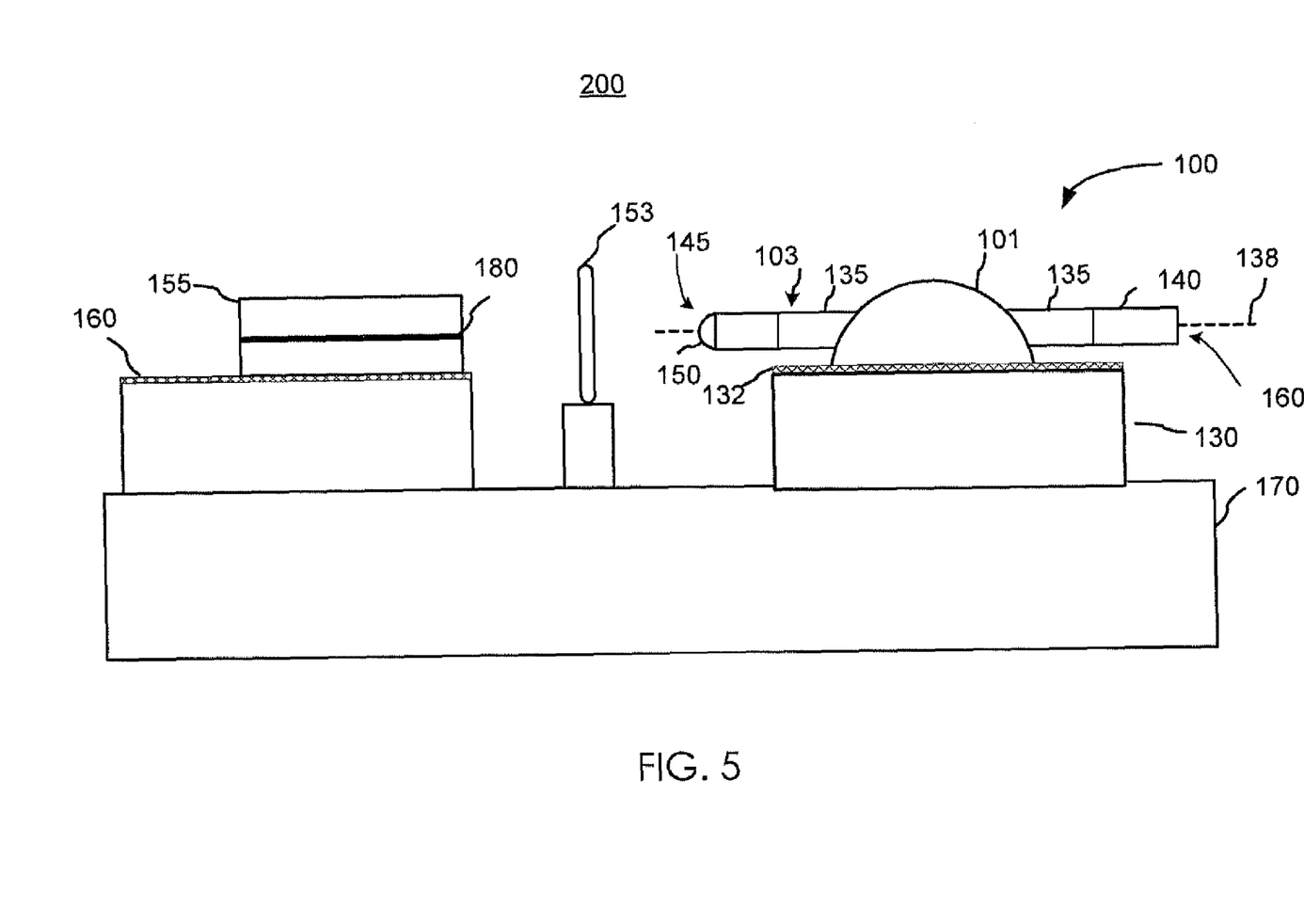
FIG. 5 is a side view of an optical module including the PM optical fiber pigtail assembly of FIG. 3.

Referring now to FIG. 5, an optical module 200 is shown which utilizes the PMFA 100 of the present invention. For purposes of clarity, reference numbers from FIGS. 3 and 4 are used in FIG. 5 where appropriate to identify the same elements. An optical component (OC) 155 is mounted on an OC submount 160, which is in turn mounted on a substrate 170. The OC submount 160 may incorporate a thermoelectric cooler (TEC) to control the operating temperature of the OC 155. The substrate 130 also supports the mounting pad 130 of the PMFA 100. The OC 155 and the PMFA 100 are mounted so as to provide efficient optical coupling between the OC 155 and the PMF 103, i.e. so that the OC 155 can efficiently receive polarized light from or couple polarized light into the proximate end 145 of the PM fiber 103. A coupling lens or lenses 153 can be optionally secured between the OC 155 and the proximate end 145 of the PMF 103 to assist in the optical coupling. The proximate end 145 may include a lensed surface to form a microlens 150, which by way of example may be a spherical, conic, toric, or chisel microlens as known in the art. The OC 155 may be embodied as a laser diode, a nonlinear optical element such as a frequency doubling crystal, a waveguide or semiconductor optical amplifier, and may have an optical waveguide 180 to guide polarized light.

In one exemplary embodiment, the OC 155 is a laser diode (LD) having a substantially planar active waveguide 180, which typically has a rectangular cross-section with a larger dimension in the horizontal direction, i.e. normal to the plane of FIG. 5, than in the vertical direction that is normal to both the substrate 170 and the mounting pad 130. In operation, the LD 155 emits highly polarized light that is coupled into the proximate end 145 of the PMF 103.

One important parameter that characterizes the quality of the optical coupling between the LD 155 and the PMF 103 is output power stability, which relates to long-term variations of the optical power at a distal end 160 of the PMF 103 for a constant optical power from the LD 155. We found that the long term power stability of the optical module 200 depends on the orientation of the polarization axes of the PMF 103 within the solder ball 101 with respect to the mounting pad 130, with the vertical orientation of the slow axis 120 providing better power stability.

Figure 6:
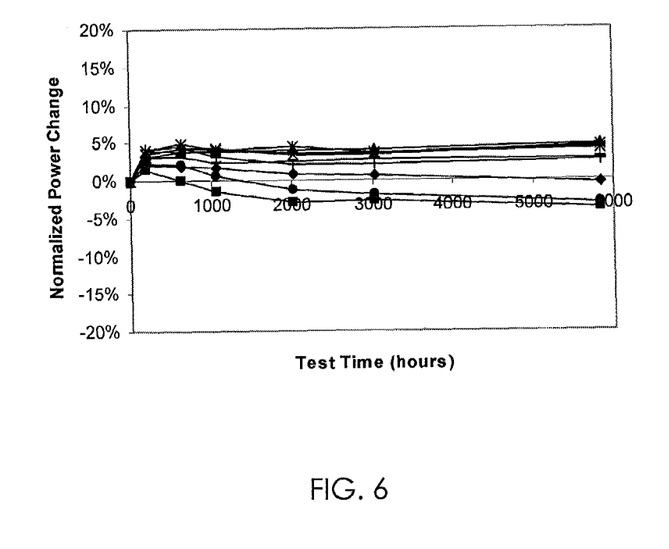
FIG. 6 is a graph illustrating long-term power stability of laser diode modules utilizing PM optical fiber pigtail assemblies wherein the PM optical fiber is soldered to a mounting pad with the slow axis normal to the mounting pad.
Figure 7:
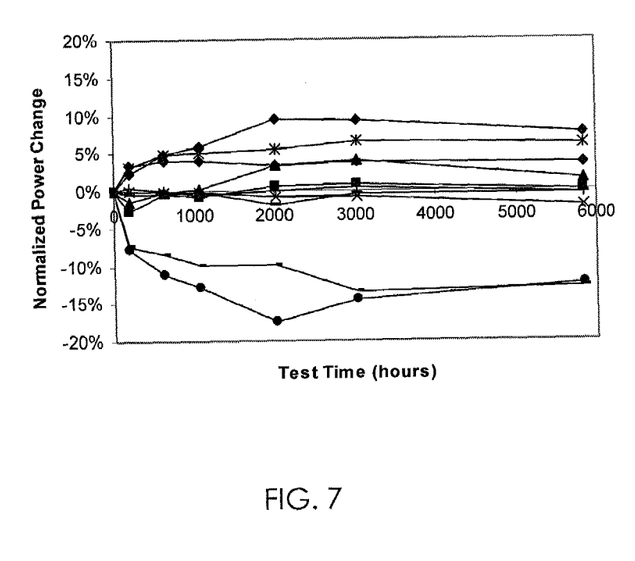
FIG. 7 is a graph illustrating enhanced long-term power stability of laser diode modules utilizing PM optical fiber pigtail assemblies wherein the PM optical fiber is soldered to a mounting pad with the slow axis parallel to the mounting pad.

This is illustrated in FIGS. 6 and 7 showing normalized variations of the output optical power measured at the distal end on the PMF 103 over 6000 hours for two sets of 9 laser modules, which differ by the orientation of the PMF 103 at the soldering locations. In each of the modules, the PMF 103 had a chisel lens 150 formed at its proximate end 145, with an edge of the chisel lens 150 oriented parallel to the laser waveguide 180.

FIG. 6 shows the long-term power stability of a first set of the laser modules, which included the PMFA 100 according to the present invention, with the PMF 103 oriented so that its slow axis 120 is normal to the mounting pad 130 within the solder ball 101. FIG. 7 shows the long-term power stability of the second set of the laser modules, which included laser modules substantially identical to the laser modules of the first set, except that the PMF 103 was oriented so that its slow axis 120 was parallel to the mounting pad 130 within the solder ball 101.

As can be clearly seen from comparing FIGS. 6 and 7, the vertical slow axis orientation of the PMF 103 in modules of FIG. 6 in accordance with the present invention provides for a considerably better long-term power stability of the laser module, with the long-term power variations for all laser modules staying within +\−5% as compared to the +10%/−15% variations of the output power provided by the modules with the parallel slow axis orientation of the PMF 103.

The better power stability of the first set of laser modules may be at least partially attributed to a better creep stability of the PMF 103 within the PMFA 100 when the PMF 103 is soldered with its slow axis, and therefore the plane of the stress rods 110a,b, oriented normally to the mounting pad 130. The term "creep" refers herein to slow vertical and horizontal displacements of the proximate PMF end 145, which may occur during laser operation due to slowly changing stresses in the solder ball 101 of the PMFA 100, causing the PMF 103 to flex. The stress-inducing regions 110a can make the PMF 103 more or less resistive to flexure depending on the orientation and symmetry of the applied stress with respect to the stress-inducing regions 110a,b. Unexpectedly, we discovered that for coupling to laser diodes with an elliptical output beam, the stress members 110a,b should be rotated so that the fiber is less resistant to flexure in a direction in which the fiber-laser alignment is most sensitive to offsets. For coupling schemes with asymmetric lenses such as the chisel lensed fibers or toric lens systems, the offset tolerance for the PMF 103 is typically smaller in the vertical direction, i.e. in a direction normal to the laser waveguide 180 and the mounting pad 130. Note that contrary to the present invention, conventional 980 nm LD pump modules having PM fiber pigtails for polarization beam combining typically utilize PMF pigtails with the plane of stress rods 110a,b oriented parallel to the plane of the LD waveguide 180 at the proximate PMF end 145.

Figure 8:
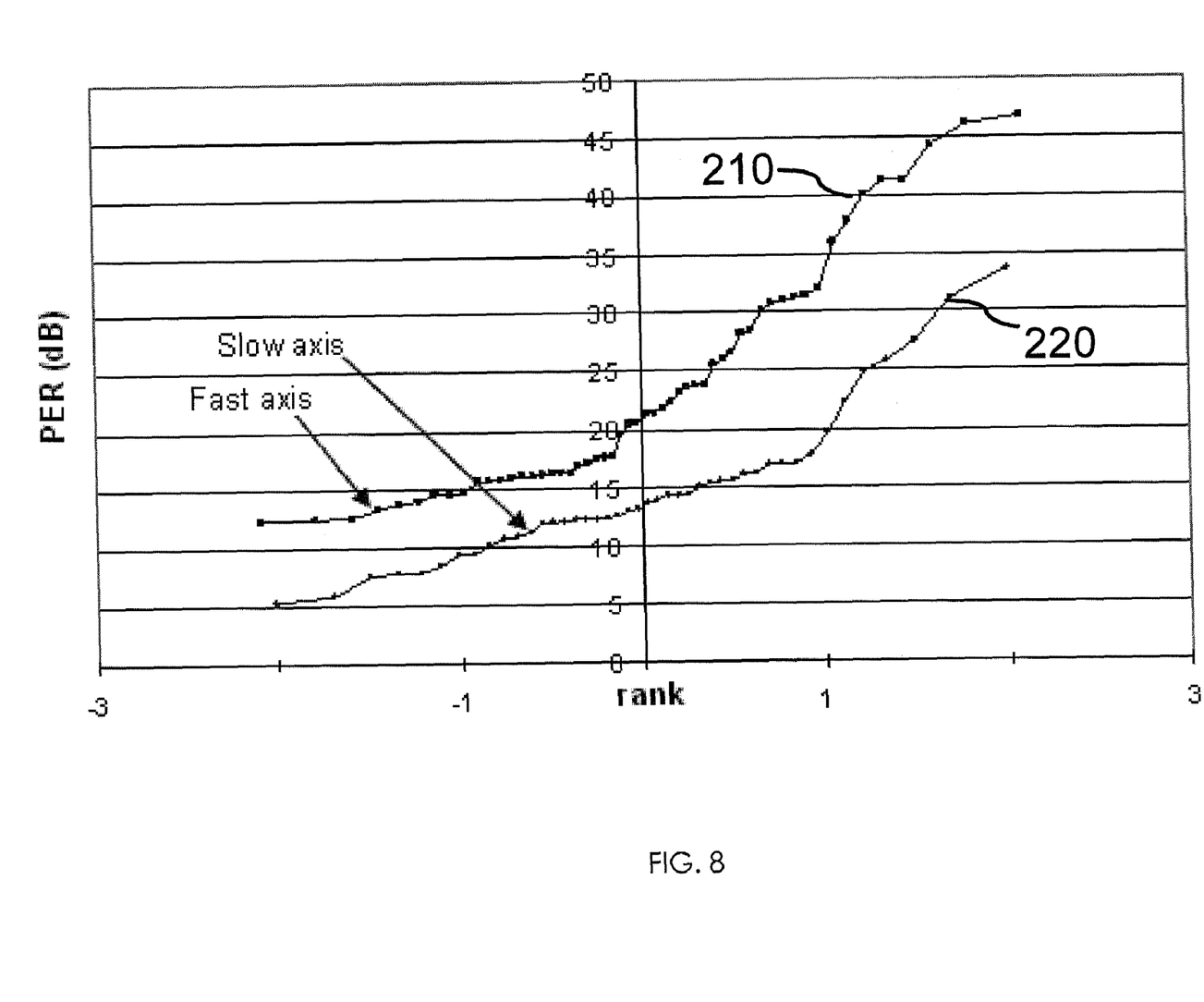
FIG. 8 is a graph illustrating the polarization extinction ratio (PER) at the distal end of a PM optical fiber pigtail of a laser diode module utilizing the solder ball fiber mounting assembly with two different orientations of the PM optical fiber within the solder ball (at the soldering location).

Another advantage of the PMFA 100 of the present invention relates to PER characteristics of light propagated through the PMF 103. As discussed hereinabove, asymmetrical external stresses applied to the PMF 103 within the solder ball 101 may interfere with the internal stresses within the PMF 103 induced by the stress rods 110a,b, and thus affect the birefringence of the soldered PMF portion 135a, possibly causing degradation of the PER of the coupled light propagating therein. We found that the resulting PER strongly depends on the orientation of the PMF 103 within the solder ball 101, with the PMF orientation of the present invention, when the plane of the stress rods 110a,b and, therefore, the slow axis 120 are perpendicular to the mounting pad 130, generally providing considerably higher PER values. This is illustrated in FIG. 8, which presents cumulative distributions of PER values for two sets of LD modules, each of which utilizing direct soldering of a PM fiber to a mounting pad made of Zirconia, with the soldered length of about 0.58 mm. The vertical coordinate of each symbol in FIG. 8 represents a PER value measured at the distal end of the PMF 103 of a particular LD module from a corresponding set. The two sets of LD modules utilize two different PMF orientations within the solder ball 101. The first set, which is represented by squares on a curve 210 and is also indicated with an arrow labeled "Fast axis", corresponds to the vertical PMF slow axis orientation of the present invention. The second set represented by symbols on a curve 220, which is also indicated with an arrow labeled "Slow axis", corresponds to the parallel orientation of the PMF slow axis relative to the mounting pad. The abscissa of each symbol provides a relative rank of the corresponding PER measurement in a respective PER distribution, and is measured in standard deviations of the PER distribution with respect to a median PER value for the set. For example, in each set about 50% of modules will have a PER greater than a PER corresponding to a rank value of 0, whereas about 84% of the modules will have a PER less than a PER value corresponding to a rank of 1 (i.e., 1 standard deviation above the median PER value). As can be clearly seen from the graph in FIG. 8, the PMF axes orientation within the solder ball 101 according to the present invention provides a considerably higher average PER value at the output of the laser modules, with over 50% of the modules having a PER greater than 20 dB, and ~84% of the modules having a PER value greater than 15 dB.

Note that the PER improvement provided by the PMFA 100 of the present invention with the vertical slow axis orientation of the PMF 103 at the location of soldering, does not depend on the presence or orientation of the chisel lens at the proximate end of the PMF 103, and is expected to remain in the absence of the chisel lens, for example when a non-chisel, such as spherical, conic, or toric microlens 150 is used at the proximate fiber end, or when the PMF 103 has a cleaved proximate end 145 and is used with an external coupling lens 153.

Although the optical module 200 is shown in FIG. 5 to include a single optical component 155, other embodiments of the optical module utilizing the PMFA 100 may have two optical components that are optically connected by the PMF 103. For example, the OC 155 coupled to the proximate end 145 of the PMF 103 can be a high power laser diode, with the distal end 160 of the PMF 103 coupled to a frequency doubling crystal (not shown), with a portion of the PMF 103 near the distal end 160 soldered to another mounting pad with a second solder ball (not shown). The orientation of the slow axis of the PMF 103 within the second solder ball at the distal end of the PMF 103 may also be orthogonal to the respective mounting pad or mounting surface.

Figure 9:
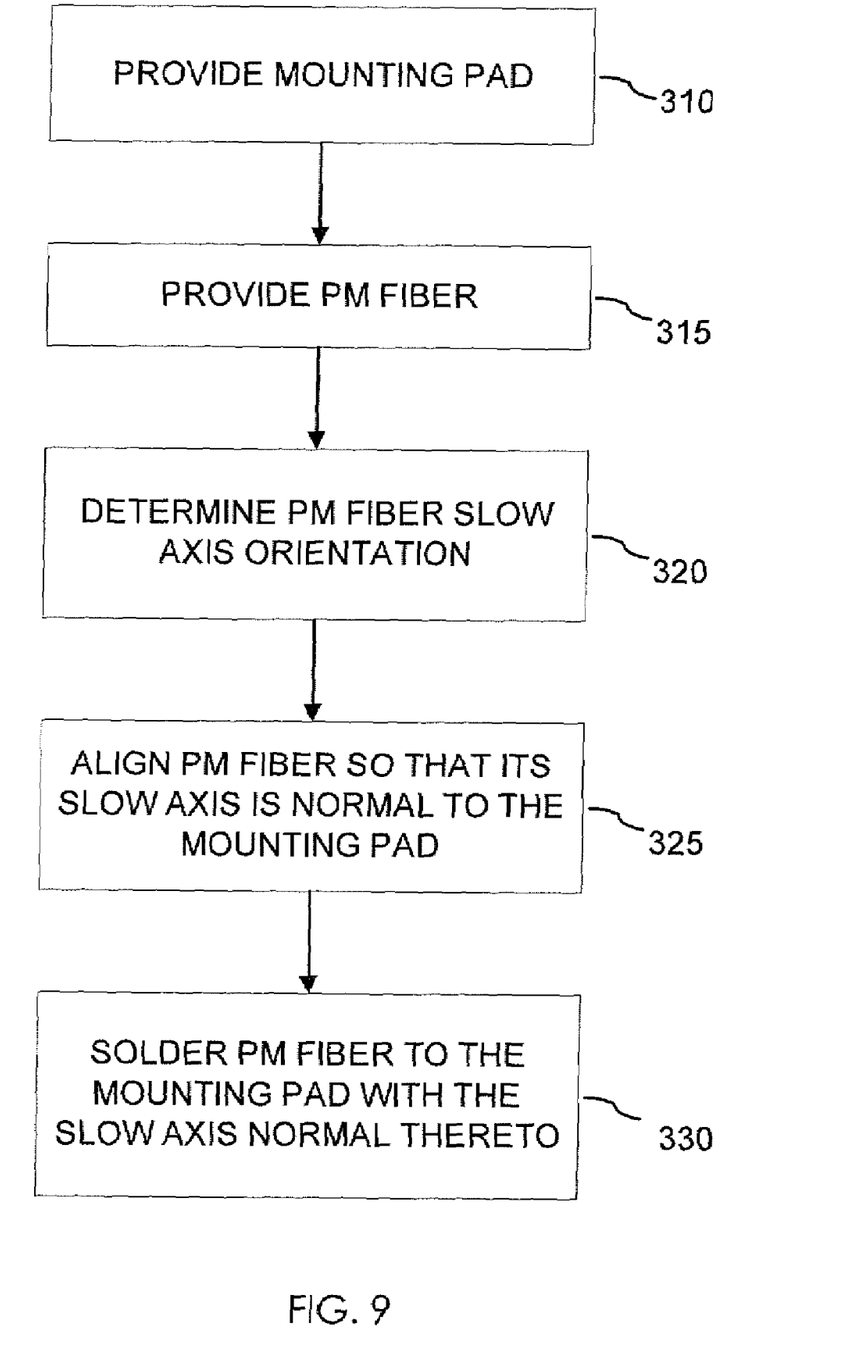
FIG. 9 is a flowchart illustrating a method for mounting a PM optical fiber in a PM optical fiber pigtail assembly according to the present invention.

Referring now to FIG. 9, another aspect of the present invention provides a method for mounting a PM fiber in a fiber pigtail assembly such as the PMFA 100, which includes the following general steps. First, in steps 310 and 315, a mounting pad 130 and a length of PMF 103 are provided. Next, an orientation of the slow axis 120 at a proximate end of the PMF is determined in a step 320; this can be done, for example, visually by looking at the proximate end of the PMF under a microscope to locate the two stress-inducing regions 110a,b; the slow axis will be directed along a line connecting centers of the stress inducing regions. Alternatively, the PMF can have markings provided at it outer jacket identifying the PMF axes orientation. In a next step 325, the PMF is oriented so its slow axis is orthogonal to the mounting pad, and in this orientation is placed on the mounting pad 130 with the proximate end of the PMF 103 at a desired distance from the optical component 155. Next, the PMF 103 is secured near its proximate end directly to the mounting pad 130 with solder so that the slow polarization axis 120 is generally perpendicular to the mounting pad. In a preferred embodiment, the step 315 may include stripping a portion of the PMF near the proximate end from its jacket or buffer layer so as to open the PMF cladding, and metallizing said portion with a metal coating for better adherence of the solder material.

In preferred embodiments, the aforedescribed steps of mounting a PM fiber in a fiber pigtail assembly may be performed in the context of assembling the optical module 200. For example, if the optical component 155 is a laser diode and the optical module 200 is a laser module with a PM fiber pigtail, the steps of assembling such module can be generally as described in U.S. Pat. No. 6,758,610 issued to Ziari et al and assigned to the assignee of the current application, which is incorporated herein by reference, with the addition of steps 320 and 325, and with the particular orientation of the PMF during soldering as described hereinabove. Turning back to FIG. 5, the mounting of the PMF 103 may be performed after the LD 155 is soldered to the OC mount 160, and both the OC mount 160 and the mounting pad 130 are affixed to the substrate 170. In one embodiment solder material is then provided about the PMF 103 at a location on the mounting pad 130 whereto the PMF 103 is to be soldered, and then is melted during the PMF alignment and attachment process using laser heating, as described in the Ziari patent. The required power of a laser heating source is relatively low, for example 1-3 Watts (W) is typically sufficient when AuSn is employed as the solder material of the solder ball 101. Initially the LD 155 and the PMF 103 are preliminary aligned. The solder material is then melted using the laser heating so that it reflows about the PM fiber adhering thereto and to the mounting pad forming the asymmetric solder ball 101 wherein the PM fiber is embedded, affixing the PM fiber to the mounting pad. In some embodiments, the LD 155 may be turned on during the melting of the solder ball 101, and optical power at the distal end of the PMF is measured to monitor the efficiency of optical coupling between the LD 155 and the PMF 103 and assist in their optical alignment. The alignment of the LD 155 and the PMF 103 can be fine-tuned while the solder ball 101 is melted for optimizing the coupling efficiency while maintaining the orientation of the slow axis of the PM fiber 103 at the soldering location 135a to be generally perpendicular to the mounting pad 130. After the heating laser source is turned off, the solder ball 101 cools, solidifies, and fixes the position of the PMF 103 relative to the mounting pad 103 and the LD 155.

Advantageously, the aforedescribed optical fiber pigtail assembly and the associated method of mounting a polarization maintaining fiber in a fiber pigtail assembly according to the present invention provide a lower-cost alternative to the prior art techniques of connecting polarization maintaining fibers to optical modules, while simultaneously enabling enhanced long-term optical coupling stability and a high polarization extinction ratio of the coupled light.

Of course numerous other embodiments may be envisioned without departing from the spirit and scope of the invention.

We claim:

1. A fiber pigtail assembly comprising:
a mounting pad;
a polarization maintaining (PM) optical fiber having a fast polarization axis and a slow polarization axis orthogonal to the fast polarization axis, and an end for optically coupling the PM optical fiber to an optical component;
wherein the PM optical fiber is soldered directly to the mounting pad near the end of the PM optical fiber without a sleeve therebetween so that the fast polarization axis is generally parallel to the mounting pad and wherein the slow polarization axis is generally orthogonal to the mounting pad, and so that a portion of the PM optical fiber near the end is embedded in a solder ball comprising solder material fixedly attaching the PM fiber to the mounting pad, wherein the solder ball is asymmetrical with respect to the fast polarization axis of the PM fiber.

2. A fiber pigtail assembly of claim 1, wherein the portion of the PM fiber has a metallic outer layer, and wherein the solder material comprises one of AuSn, SnAgCu, BiSn or AuGe.

3. A fiber pigtail assembly of claim 2, wherein the solder material comprises a eutectic alloy.

4. A fiber pigtail assembly of claim 3, wherein the metallic outer layer of the PM fiber comprises Au, and wherein the solder material comprises an eutectic alloy of AuSn encompassing the metallic outer layer of the PM fiber and adhering thereto.

5. A fiber pigtail assembly of claim 1, wherein the solder ball comprises glass solder material encompassing the portion of the PM fiber near the end thereof.

6. A fiber pigtail assembly of claim 1, wherein the mounting pad comprises ceramic material.

7. A fiber pigtail assembly of claim 6, wherein the ceramic material comprises one of zirconia and alumina.

8. A fiber pigtail assembly of claim 2, wherein the mounting pad has a metal layer for soldering the PM fiber thereto.

9. A fiber pigtail assembly of claim 1, wherein the PM fiber has a core and two stress inducing rods embedded within the PM fiber on opposite sides of the core, and wherein the slow axis is generally parallel to a line connecting centers of the stress inducing rods.

10. A fiber pigtail assembly of claim 1, wherein the mounting pad has a coefficient of thermal expansion that is less than a coefficient of thermal expansion of the solder material.

11. An optical module comprising the fiber pigtail assembly of claim 1 and the optical component disposed to receive polarized light from or couple polarized light into the end of the PM fiber.

12. A fiber pigtail assembly of claim 1, wherein the end of the PM fiber comprises a lens for coupling to the optical component.

13. A fiber pigtail assembly of claim 12, wherein the lens is a chisel lens.

14. A fiber pigtail assembly of claim 12, wherein the lens is a non-chisel lens.

15. A fiber pigtail assembly of claim 1, wherein the solder ball comprises a generally flat portion for adhering to the mounting pad.

16. A method of mounting a polarization maintaining (PM) fiber in a fiber pigtail assembly, the fiber having an end for coupling polarized light into or out of the PM fiber, the method comprising:

a) providing a mounting pad;
b) determining the direction of a slow polarization axis at the end of the PM fiber;
c) securing the PM fiber near the end directly to the mounting pad with solder so that the slow polarization axis is generally perpendicular to the mounting pad, and so that a portion of the PM fiber near the end is embedded in a solder ball fixedly attaching the Pm fiber to the mounting pad, wherein the solder ball is asymmetrical with respect to a fast polarization axis of the PM fiber.

17. A method of claim 16, wherein step (c) comprises d) placing the PM fiber over the mounting pad in a desired position so that the slow polarization axis is generally perpendicular to the mounting pad,
e) providing solder material about a portion of the PM fiber placed over the mounting pad, and
f) melting the solder material so that it reflows about the PM fiber adhering thereto and to the mounting pad forming an asymmetric solder ball wherein the PM fiber is embedded affixing the PM fiber to the mounting pad.

18. A method of claim 16 further comprising the step of providing an optical component to be optically coupled to the end of the PM fiber, wherein step (c) comprises:

passing light between the optical component and the end of the PM fiber, monitoring the efficiency of optical coupling therebetween, and aligning the end of the PM fiber relative to the optical component for optimizing said efficiency while maintaining the orientation of the slow axis of the PM fiber to be generally perpendicular to the mounting pad.

\* \* \* \* \*